(12) United States Patent
Michalakis et al.

(10) Patent No.: US 10,717,445 B2
(45) Date of Patent: Jul. 21, 2020

(54) SYSTEMS AND METHODS FOR END-USER MODIFICATION OF DRIVING BEHAVIOR OF AUTONOMOUS VEHICLE

(71) Applicant: Toyota Research Institute, Inc., Los Altos, CA (US)

(72) Inventors: Nikolaos Michalakis, Saratoga, CA (US); Julian M. Mason, Redwood City, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 74 days.

(21) Appl. No.: 15/929,025

(22) Filed: Jun. 26, 2018

(65) Prior Publication Data
US 2019/0389482 A1 Dec. 26, 2019

(51) Int. Cl.
| | | |
|---|---|---|
| *B60W 50/08* | (2020.01) | |
| *G05D 1/00* | (2006.01) | |
| *G06F 3/0482* | (2013.01) | |
| *H04W 4/14* | (2009.01) | |
| *H04L 12/58* | (2006.01) | |
| *B60W 50/00* | (2006.01) | |

(52) U.S. Cl.
CPC ......... *B60W 50/085* (2013.01); *G05D 1/0088* (2013.01); *B60W 2050/0064* (2013.01); *G05D 2201/0213* (2013.01); *G06F 3/0482* (2013.01); *H04L 51/22* (2013.01); *H04L 51/24* (2013.01); *H04W 4/14* (2013.01)

(58) Field of Classification Search
None
See application file for complete search history.

(56) References Cited

U.S. PATENT DOCUMENTS

| 6,454,036 B1 | 9/2002 | Airey et al. |
| 7,421,336 B2 | 9/2008 | Iwami et al. |
| 8,996,224 B1* | 3/2015 | Herbach ............. G05D 1/0011 180/116 |
| 9,889,861 B2 | 2/2018 | Doshi |
| 10,048,683 B2* | 8/2018 | Levinson ............. G01S 17/023 |

(Continued)

OTHER PUBLICATIONS

K. Park et al. "Learning user preferences of route choice behaviour for adaptive route guidance," IET Intell. Transp. Syst., 2007, 1, (2), pp. 159-166.

*Primary Examiner* — Dale W Hilgendorf
*Assistant Examiner* — Alexander C. Bost
(74) *Attorney, Agent, or Firm* — Christopher G. Darrow; Darrow Mustafa PC

(57) ABSTRACT

System, methods, and other embodiments described herein relate to end-user modification of the driving behavior of a vehicle when operating in an autonomous driving mode. One embodiment stores disengagement data associated with an autonomous driving mode of the vehicle; outputs, to an end user from the stored disengagement data, a report of a disengagement that occurred along a particular route identified by the end user due to incorrect identification, by a sensor system of the vehicle, of an object; receiving, from the end user, a corrective input that includes labeling the object; and modifying automatically one or more autonomous driving modules of the vehicle in accordance with the corrective input to prevent future disengagements when the vehicle is traveling along the particular route in the autonomous driving mode.

16 Claims, 11 Drawing Sheets

(56) References Cited

U.S. PATENT DOCUMENTS

| | | | |
|---|---|---|---|
| 10,169,678 B1* | 1/2019 | Sachdeva | G06K 9/6289 |
| 2016/0026182 A1 | 1/2016 | Boroditsky et al. | |
| 2017/0135621 A1 | 5/2017 | Lee et al. | |
| 2017/0192426 A1* | 7/2017 | Rust | B60W 30/00 |
| 2017/0267256 A1 | 9/2017 | Minster et al. | |
| 2018/0012082 A1* | 1/2018 | Satazoda | G06K 9/00805 |
| 2018/0136332 A1* | 5/2018 | Barfield, Jr. | G01S 17/42 |
| 2018/0237030 A1* | 8/2018 | Jones | G05D 1/0061 |
| 2019/0049981 A1* | 2/2019 | Fischer | G05D 1/0221 |
| 2019/0135283 A1* | 5/2019 | Bonk | B60W 30/18 |
| 2019/0137287 A1* | 5/2019 | Pazhayampallil | G01C 21/32 |
| 2019/0163176 A1* | 5/2019 | Wang | G05D 1/0027 |
| 2019/0235499 A1* | 8/2019 | Kazemi | B60T 7/22 |
| 2019/0243364 A1* | 8/2019 | Cohen | G05D 1/0088 |
| 2019/0243372 A1* | 8/2019 | Huval | B60W 50/045 |
| 2019/0311559 A1* | 10/2019 | Bigio | G07C 5/0841 |

* cited by examiner

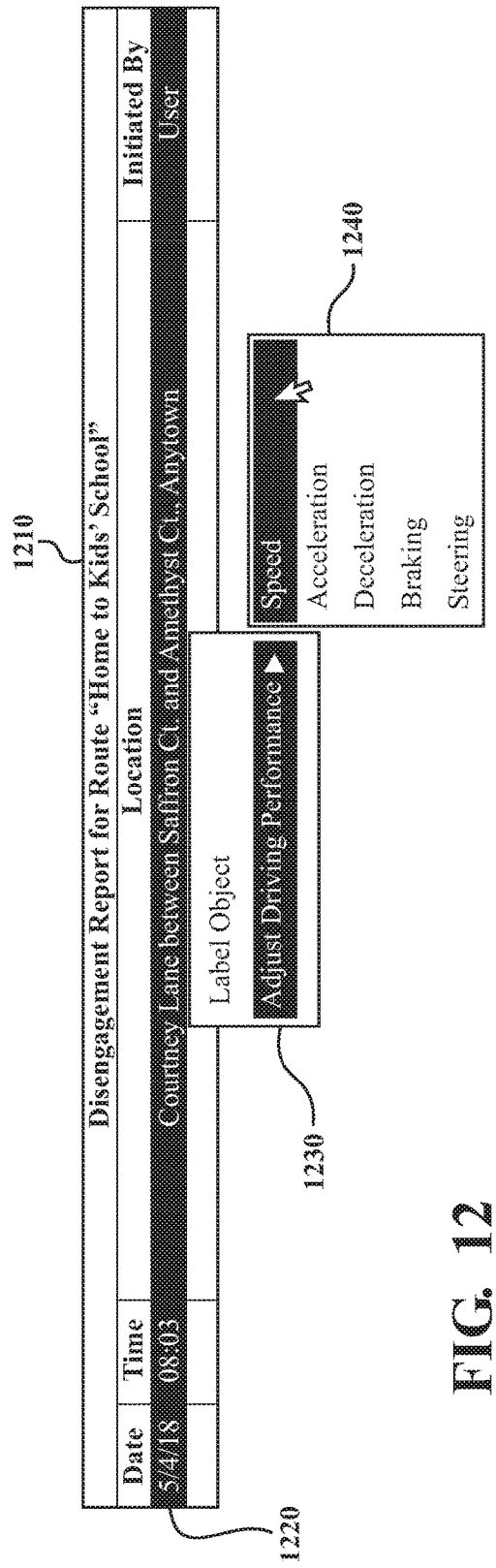

SYSTEMS AND METHODS FOR END-USER MODIFICATION OF DRIVING BEHAVIOR OF AUTONOMOUS VEHICLE

TECHNICAL FIELD

The subject matter described herein relates in general to autonomous vehicles and, more particularly, to systems and methods for permitting an end user to modify the driving behavior of such a vehicle.

BACKGROUND

Autonomous vehicles can sense a surrounding environment (e.g., obstacles, roadway, etc.) and navigate autonomously through the surrounding environment without human input or at least partially without human input. That is, autonomous vehicles can operate according to different levels of autonomy. For example, an autonomous vehicle can operate according to the Society of Automotive Engineers (SAE) Level 2 classification for autonomous driving. In this autonomous operating mode, an autonomous vehicle relies, at least in part, on handovers from autonomous operation to manual control by a vehicle operator when the vehicle cannot or should not autonomously operate due to various circumstances. A handover can be initiated by the vehicle or through the intervention of an operator.

Currently, it is difficult to engineer, as a consumer product, an autonomous driving system that can perform satisfactorily under a wide variety of different conditions. Despite manufacturers' efforts to train an autonomous vehicle to successfully handle a variety of common driving situations, the number of unique situations and boundary conditions is significant. Consequently, handovers still occur more frequently than some end users might prefer.

SUMMARY

Systems and methods for modifying the driving behavior of a vehicle are presented herein. One embodiment is a system for modifying the driving behavior of a vehicle that comprises one or more processors and a memory communicably coupled to the one or more processors. The memory stores one or more autonomous driving modules including instructions that when executed by the one or more processors cause the one or more processors to control the vehicle when the vehicle is operating in an autonomous driving mode. The memory also stores a tracking module including instructions that when executed by the one or more processors cause the one or more processors to store disengagement data associated with the autonomous driving mode. The memory also stores a correction module including instructions that when executed by the one or more processors cause the one or more processors to output, to an end user from the stored disengagement data, a report of a disengagement that occurred along a particular route identified by the end user due to incorrect identification, by a sensor system of the vehicle, of an object; receive, from the end user, a corrective input that includes labeling the object; and modify automatically the one or more autonomous driving modules in accordance with the corrective input to prevent future disengagements when the vehicle is traveling along the particular route in the autonomous driving mode.

Another embodiment is a method of modifying the driving behavior of a vehicle, comprising storing disengagement data associated with an autonomous driving mode of the vehicle; outputting, to an end user from the stored disengagement data, a report of a disengagement that occurred along a particular route identified by the end user due to incorrect identification, by a sensor system of the vehicle, of an object; receiving, from the end user, a corrective input that includes labeling the object; and modifying automatically one or more autonomous driving modules of the vehicle in accordance with the corrective input to prevent future disengagements when the vehicle is traveling along the particular route in the autonomous driving mode.

Another embodiment is a system for modifying the driving behavior of a vehicle that comprises one or more processors and a memory communicably coupled to the one or more processors. The memory stores one or more autonomous driving modules including instructions that when executed by the one or more processors cause the one or more processors to control the vehicle when the vehicle is operating in an autonomous driving mode. The memory also stores a tracking module including instructions that when executed by the one or more processors cause the one or more processors to store disengagement data associated with the autonomous driving mode. The memory also stores a correction module including instructions that when executed by the one or more processors cause the one or more processors to output, to an end user, a report of stored disengagement data associated with a particular route identified by the end user; receive, from the end user, one or more corrective inputs regarding the stored disengagement data associated with the particular route; and modify automatically the one or more autonomous driving modules in accordance with the one or more corrective inputs to prevent future disengagements when the vehicle is traveling along the particular route in the autonomous driving mode.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 12 illustrates a user interface for adjusting the speed at which a vehicle travels in an autonomous driving mode for a segment of a particular route selected by an end user, in accordance with an illustrative embodiment of the invention.

FIG. 13 illustrates a user interface for presenting to an end user a list of marked disengagements, in accordance with an illustrative embodiment of the invention.

DETAILED DESCRIPTION

Systems, methods, and other embodiments associated with permitting an end user to modify the driving behavior of an autonomous vehicle are disclosed. Rather than attempting to anticipate every possible scenario an autonomous vehicle might encounter, the embodiments disclosed herein provide an owner or other consumer end user of an autonomous vehicle with a toolkit to modify the behavior of the vehicle when it is operating in an autonomous driving mode. Many consumers use their vehicles to travel a relatively small number of routes repeatedly. For example, an end user might use his or her vehicle to travel from home to work and back again, from work to a favorite lunch restaurant and back to the office again, from home to his or her children's schools and back again, from home to a relative's residence and back again, etc. The embodiments disclosed herein permit an end user to improve the performance of an autonomous vehicle for his or her particular frequently driven routes.

The embodiments disclosed herein track the performance of the autonomous driving system of a vehicle, storing data regarding disengagements as the disengagements occur. A "disengagement" is the cessation of the vehicle's operation in an autonomous driving mode due to the vehicle being unable to handle a particular situation or due to intervention by a human operator. In either type of disengagement scenario, a handover occurs to manual control of the vehicle by a human operator. The embodiments disclosed herein permit the end user to review a report of one or more disengagements that occurred along a particular route selected by the end user. By entering corrective inputs such as labeling an object or adjusting the vehicle's driving performance (for example, speed, steering, acceleration, deceleration, or braking), future disengagements can be prevented when the end user travels his or her particular frequently traveled routes. In essence, the embodiments disclosed herein permit an end user to teach an autonomous vehicle how to drive his or her particular frequently driven routes successfully without the need for handovers.

Figure 1:
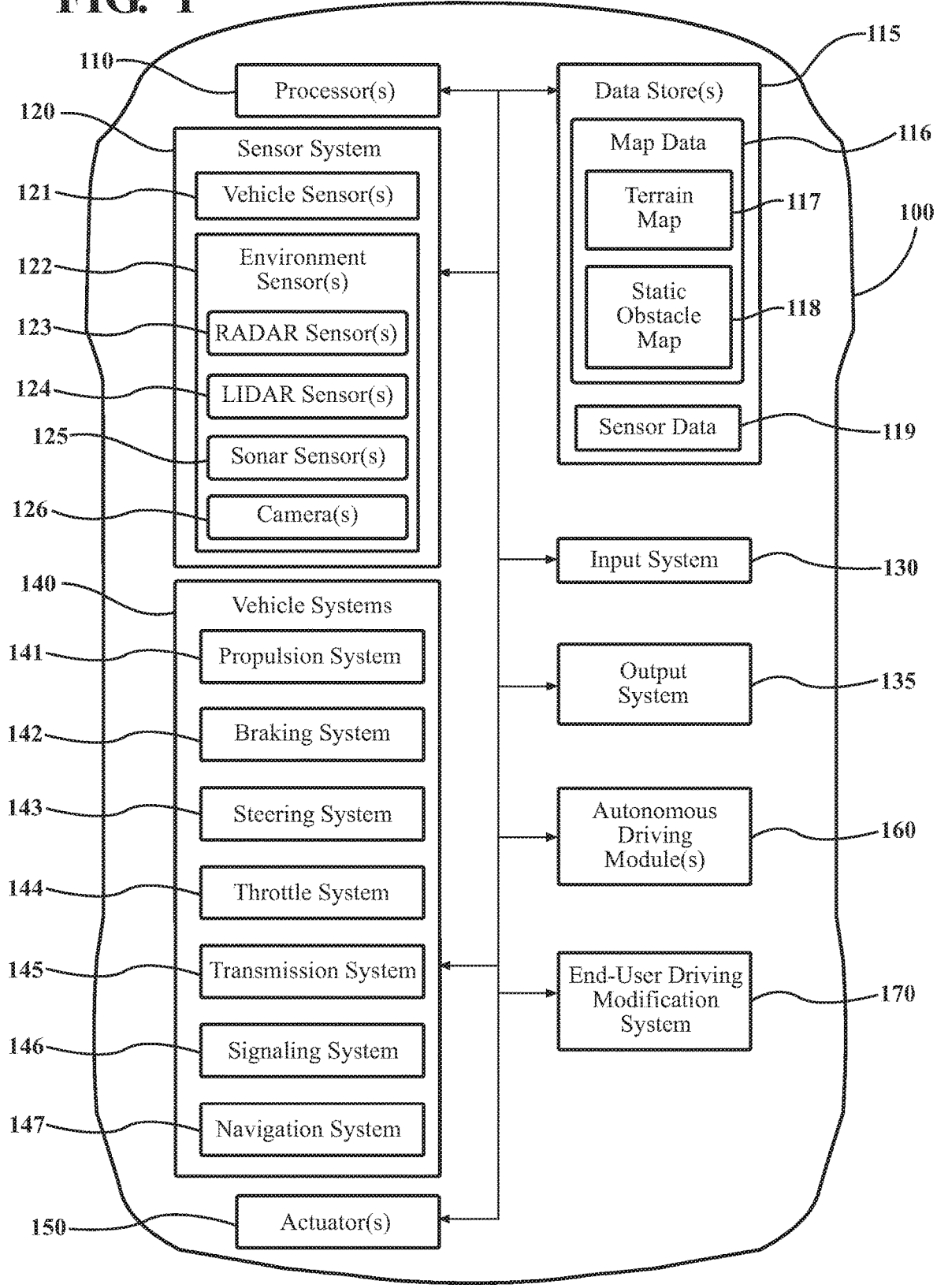
FIG. 1 illustrates one embodiment of an autonomous vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100, either wholly or in part. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-13 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Vehicle 100 includes an end-user driving modification system 170, which is implemented to perform methods and other functions as disclosed herein relating to an end user modifying the driving behavior of vehicle 100 when it is operating in an autonomous driving mode controlled by autonomous driving module(s) 160. It should be appreciated that the end-user driving modification system 170 can take many different forms but, in general, functions to (1) store disengagement data associated with an autonomous driving mode of vehicle 100; (2) output, to an end user, a report of stored disengagement data associated with a particular route identified by the end user; (3) receive, from the end user, one or more corrective inputs regarding the stored disengagement data associated with the particular route; and (4) modify automatically the autonomous driving modules 160 in accordance with the one or more corrective inputs to prevent future disengagements when the vehicle 100 is traveling along the particular route in the autonomous driving mode.

Figure 2:
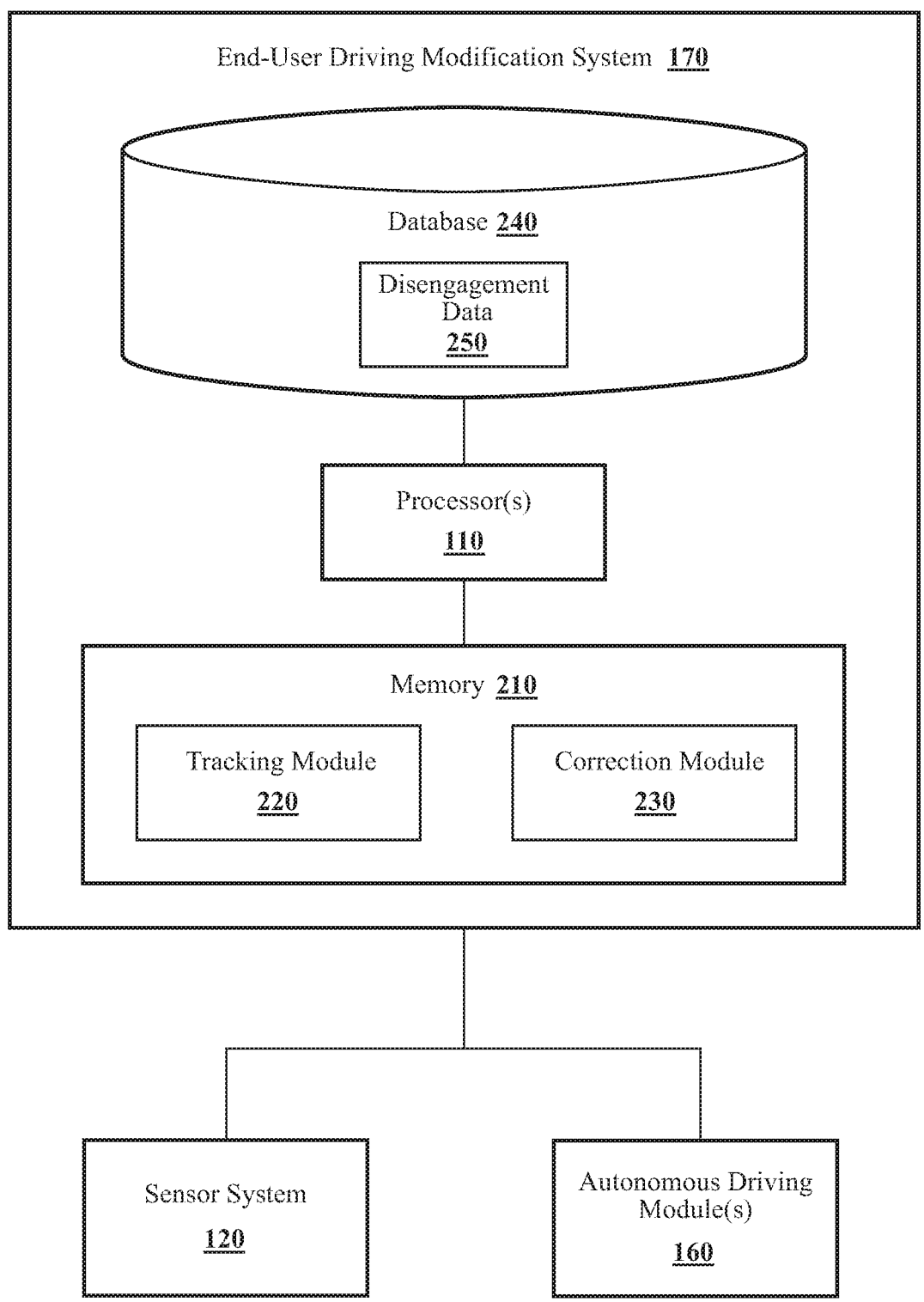
FIG. 2 illustrates one embodiment of an end-user driving modification system.

With reference to FIG. 2, one embodiment of the end-user driving modification system 170 of FIG. 1 is further illustrated. The end-user driving modification system 170 is shown as including one or more processors 110 from the vehicle 100 of FIG. 1. Accordingly, the one or more processors 110 may be a part of the end-user driving modification system 170, the end-user driving modification system 170 may include a separate processor from the one or more processors 110 of the vehicle 100, or the end-user driving modification system 170 may access the one or more processors 110 through a data bus or another communication path (see FIG. 3). In one embodiment, the end-user driving modification system 170 includes a memory 210 that stores a tracking module 220 and a correction module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the one or more processors 110, cause the one or more processors 110 to perform the various functions disclosed herein.

The tracking module 220 generally includes instructions that function to control the one or more processors 110 to store data associated with disengagements when they occur. For each disengagement, the disengagement data 250 stored in database 240 can include, without limitation, the date and time of the disengagement, the location where the disengagement occurred, and whether the disengagement occurred due to action by the autonomous driving module(s) 160 of vehicle 100 or due to intervention by a human operator. The location of the disengagement can be stored as, for example, GPS coordinates but can be translated to a format more readily understood by an end user when a disengagement report is later presented to the end user, as discussed further below. For example, the location of a particular disengagement can be presented to the end user as "32nd Street between 7th and 8th Avenues."

The disengagement data 250, in some embodiments, also includes sensor data from one or more sensors of sensor system 120 (see FIG. 1). For example, tracking module 220 can store image (camera) data and/or LIDAR data captured during a period bracketing the disengagement to facilitate later analysis by and corrective inputs from an end user of vehicle 100. More specifically, in one embodiment, the end user annotates image data or other visual sensor data to label objects that vehicle 100 incorrectly identified, either by misidentifying them or by failing to identify them at all.

Database 240, which stores disengagement data 250, can reside in vehicle 100, can reside on a network server ("in the cloud"), or can be distributed between vehicle 100 and one or more network servers, depending on the embodiment. That is, depending on available local storage, the availability to vehicle 100 of a wireless network connection, and available network bandwidth, disengagement data 250 can be stored at vehicle 100, on a network server, or both. In one embodiment, when a wireless network connection is available, tracking module 220 temporarily buffers disengagement data 250 and transmits it periodically or opportunistically to a network server for storage.

Another aspect of tracking module 220, in some embodiments, is storing a marker (e.g., a particular kind of data value or token) in disengagement data 250 in response to a request from an end user at approximately the time when the disengagement occurs. When the end user is traveling in vehicle 100 and a disengagement occurs, the end user can input a request to set a marker to facilitate later retrieval of information regarding that particular disengagement. Such a marker can be requested through the pushing of a button on the instrument panel of vehicle 100, through a voice command, or other input. This feature functions somewhat like an electronic "bookmark." An illustrative user interface for an end user to view marked disengagements is discussed below in connection with FIG. 13.

The correction module 230 generally includes instructions to modify the autonomous driving behavior of vehicle 100 based on corrective inputs it receives from an end user who has reviewed a report of disengagements from disengagement data 250. In some embodiments, autonomous driving module(s) 160 are engineered so that correction module 230 can modify them based on the corrective inputs received from the end user. In some embodiments, the functionality of correction module 230 is distributed between a portion that is local to vehicle 100 and a portion hosted by one or more remote network servers. In other embodiments, the functionality of correction module 230 resides entirely in vehicle 100. In still other embodiments, the functionality of correction module 230, except for a communication interface for modifying autonomous driving module(s) 160, resides entirely in one or more remote servers.

One aspect of correction module 230 is outputting, to an end user of vehicle 100, a report of one or more disengagements associated with a particular route identified by the end user. This disengagement report is drawn from the stored disengagement data 250. In one embodiment, the end user logs onto a server via a Web-enabled device such as a desktop computer, laptop computer, tablet computer, or other mobile computing device and selects a route from a list of recently traveled routes to view a report of disengagements that occurred along that route. In another embodiment, a display and user interface by which the end user interacts with end-user driving modification system 170 are integrated with the vehicle 100. Illustrative user interfaces for accomplishing these and other tasks are discussed below in connection with FIGS. 8-13.

Another aspect of correction module 230 is receiving, from the end user, one or more corrective inputs regarding the disengagements presented to the end user in the disengagement report for the selected route. As discussed further below, these corrective inputs, in one embodiment, involve labeling objects that were incorrectly identified, leading to disengagements, whether vehicle 100 misidentified them or failed to identify them altogether. In another embodiment, the end user can enter corrective inputs that adjust various aspects of the autonomous-driving performance of vehicle 100 when traveling in one or more specific locations along the route selected by the end user. Such performance adjustments can include, without limitation, adjustments to speed, braking, steering, acceleration, and deceleration.

Another aspect of correction module 230 is automatically modifying autonomous driving module(s) 160 in accordance with the corrective inputs received from the end user to prevent future disengagements when vehicle 100 is traveling along the route selected by the end user. In this way, the end user can improve the performance of the autonomous driving system of vehicle 100 for his or her particular frequently traveled routes.

Figure 3:
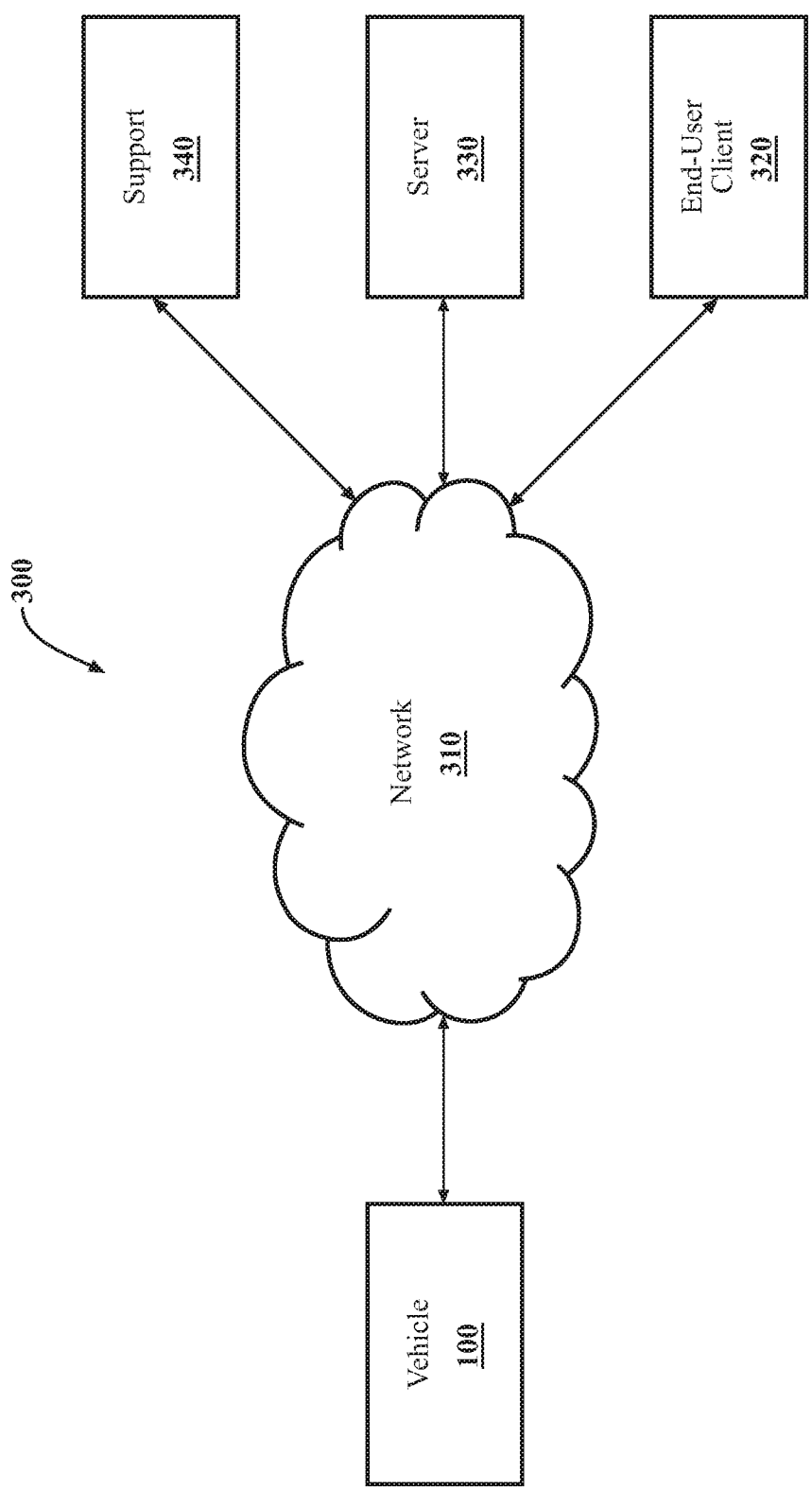
FIG. 3 illustrates a network architecture in which systems and methods disclosed herein may be implemented, in accordance with an illustrative embodiment of the invention.

FIG. 3 illustrates a network architecture 300 in which systems and methods disclosed herein may be implemented, in accordance with an illustrative embodiment of the invention. In FIG. 3, end-user client computing device 320 communicates over network 310 with a server 330 to present, to an end user of vehicle 100, disengagement reports for selected routes and to accept and transmit, to server 330, corrective inputs to prevent future disengagements in the particular locations associated with those disengagements. In some embodiments, server 330 authenticates the end user before permitting access to end-user driving modification system 170. Such authentication can include, for example, verifying a username and password entered by the end user. In one embodiment, end-user client computing device 320 is a desktop computer, laptop computer, tablet computer, or other mobile computing device. In another embodiment, end-user client computing device 320 is integrated with the vehicle 100. In some embodiments, a portion of network 310 may include the Internet, and end-user client computing device 320, whether separate from vehicle 100 or integrated with vehicle 100, executes a Web browser to communicate with server 330 and present a user interface to the end user.

Server 330 receives disengagement data 250 from vehicle 100 to present the disengagement reports to the end user. As mentioned above, in some embodiments, server 330 hosts database 240, which stores disengagement data 250. Server 330 also transmits the end user's corrective inputs to the portion of correction module 230 that is local to vehicle 100. That portion of correction module 230 modifies autonomous driving module(s) 160 in accordance with the corrective inputs.

In some embodiments, the end user can forward a copy of a disengagement report to a support entity 340 via server 330. This permits the end user to receive advice and support from an expert who is experienced in reviewing disengagement reports. In some embodiments, the support entity 340 is an individual or team at the company that manufactured vehicle 100. In other embodiments, the support entity 340 is a third-party individual or organization.

As discussed above, the functionality of correction module 230, in some embodiments, is distributed between vehicle 100 and one or more network servers such as server 330. In other embodiments, this functionality resides entirely in vehicle 100, in which case server 330 is locally hosted in vehicle 100 instead of being remotely located, as depicted in FIG. 3. In still other embodiments, the functionality of correction module 230, except for a communication interface to facilitate modifying autonomous driving module(s) 160, is hosted entirely on one or more remote servers such as server 330.

Figure 4:
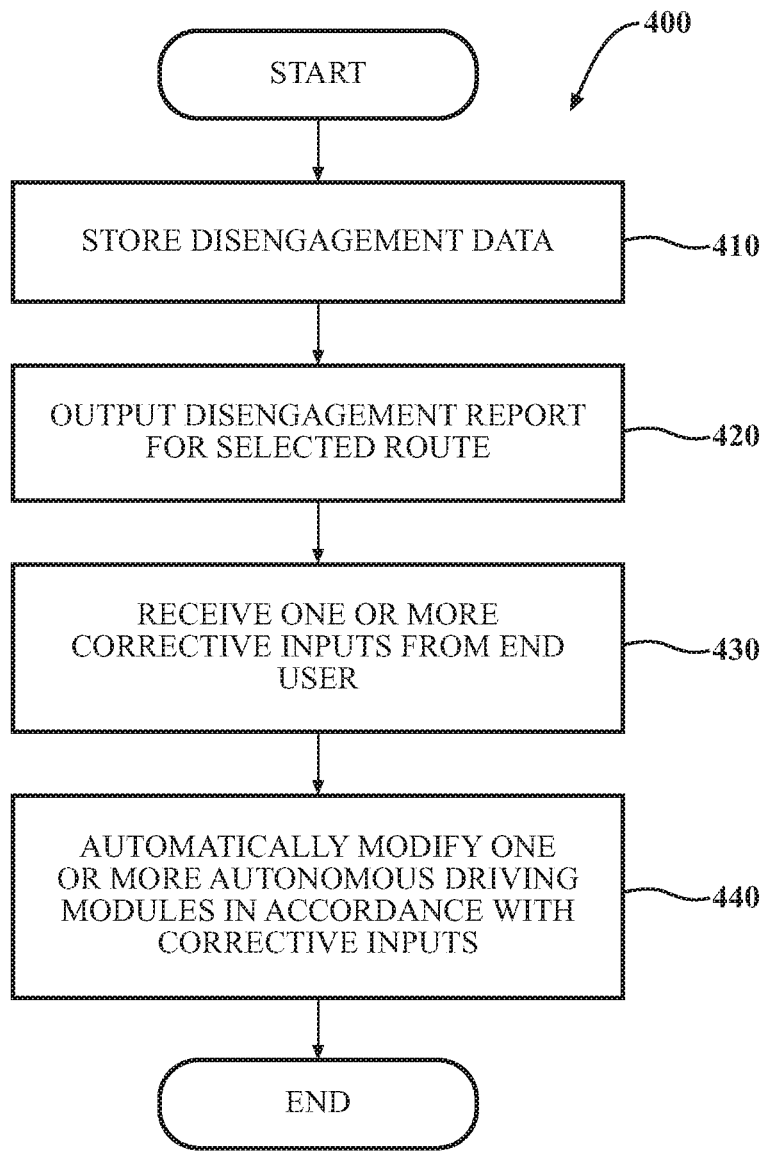
FIG. 4 is a flowchart of a method of modifying the driving behavior of a vehicle, in accordance with an illustrative embodiment of the invention.

Additional aspects of end-user driving modification system 170 will be discussed in relation to FIG. 4. FIG. 4 illustrates a flowchart of a method 400 that is associated with modifying the driving behavior of a vehicle. Method 400 will be discussed from the perspective of the end-user driving modification system 170 of FIGS. 1 and 2. While method 400 is discussed in combination with the end-user driving modification system 170, it should be appreciated that the method 400 is not limited to being implemented within the end-user driving modification system 170 but is instead one example of a system that may implement the method 400.

Referring to FIG. 4, at block 410, tracking module 220 stores disengagement data 250 associated with an autonomous driving mode of vehicle 100. As discussed above, for each disengagement, the disengagement data 250 stored in database 240 can include, without limitation, the date and time of the disengagement, the location where the disengagement occurred, and whether the disengagement occurred due to action by the autonomous driving module(s) 160 of vehicle 100 or due to intervention by a human operator. The location of the disengagement can be stored as, for example, GPS coordinates but can be translated to a format more readily understood by an end user when a disengagement report is later presented to the end user. The disengagement data 250, in some embodiments, also includes sensor data from one or more sensors of sensor system 120 (see FIG. 1). For example, tracking module 220 can store image (camera) data and/or LIDAR data captured during a period bracketing the disengagement to facilitate later analysis by and corrective inputs from an end user of vehicle 100.

At block 420, correction module 230 outputs, to an end user, a disengagement report from disengagement data 250 associated with a particular route identified by the end user. In one embodiment, the end user logs onto a server via a Web-enabled device such as a desktop computer, laptop computer, tablet computer, or other mobile computing device and selects a route from a list of recently traveled routes to view a report of disengagements that occurred along that route. In another embodiment, a display and user interface for interacting with end-user driving modification system 170 are integrated with the vehicle 100.

At block 430, correction module 230 receives, from the end user, one or more corrective inputs regarding the disengagement data 250 associated with the particular selected route. As mentioned above, the corrective inputs can include, without limitation, labeling an incorrectly labeled object or adjusting the autonomous-driving performance of the vehicle 100 without regard to incorrectly labeled objects. Such autonomous-driving performance adjustments can include, without limitation, adjustments to speed, braking, steering, acceleration, and deceleration.

At block 440, correction module 230 automatically modifies autonomous driving module(s) 160 in accordance with the one or more corrective inputs received from the end user to prevent future disengagements at the applicable location(s) when the vehicle is traveling along the particular route in an autonomous driving mode. In this way, the end user can improve the performance of the autonomous driving system of vehicle 100 for his or her particular frequently traveled routes.

Figure 5:
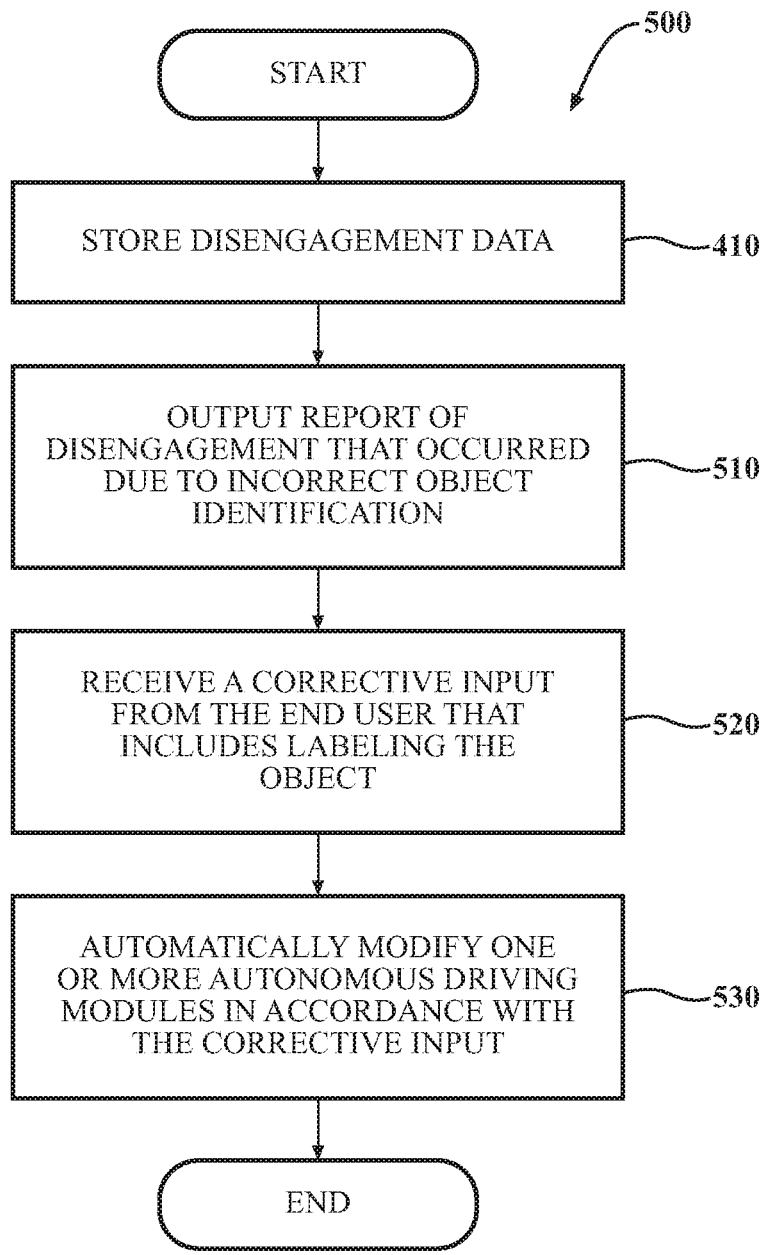
FIG. 5 is a flowchart of a method of modifying the driving behavior of a vehicle, in accordance with another illustrative embodiment of the invention.

FIG. 5 is a flowchart of a method 500 of modifying the driving behavior of a vehicle, in accordance with another illustrative embodiment of the invention. Like method 400, method 500 begins with tracking module 220 storing disengagement data 250 at block 410. At block 510, correction module 230 outputs, to an end user from the stored disengagement data 250, a report of a disengagement that occurred along a particular route identified by the end user due to incorrect identification, by the sensor system 120, of an object. An incorrectly identified object can be one that the sensor system 120 of vehicle 100 misidentified (e.g., mistaking a lamp post for a road sign), or it can be an object that the sensor system 120 failed to identify altogether. At block 520, correction module 230 receives, from the end user, a corrective input that includes labeling the incorrectly identified object. For example, in one embodiment, the end user can label the object by graphically annotating visual sensor data (e.g., image and/or LIDAR data) from sensor system 120 stored by tracking module 220 as part of disengagement data 250. At block 530, correction module 230 automatically modifies autonomous driving module(s) 160 in accordance with the corrective input (the object labeling) received from the end user to prevent future disengagements when the vehicle is traveling along the applicable portions of the selected route in an autonomous driving mode.

Figure 6:
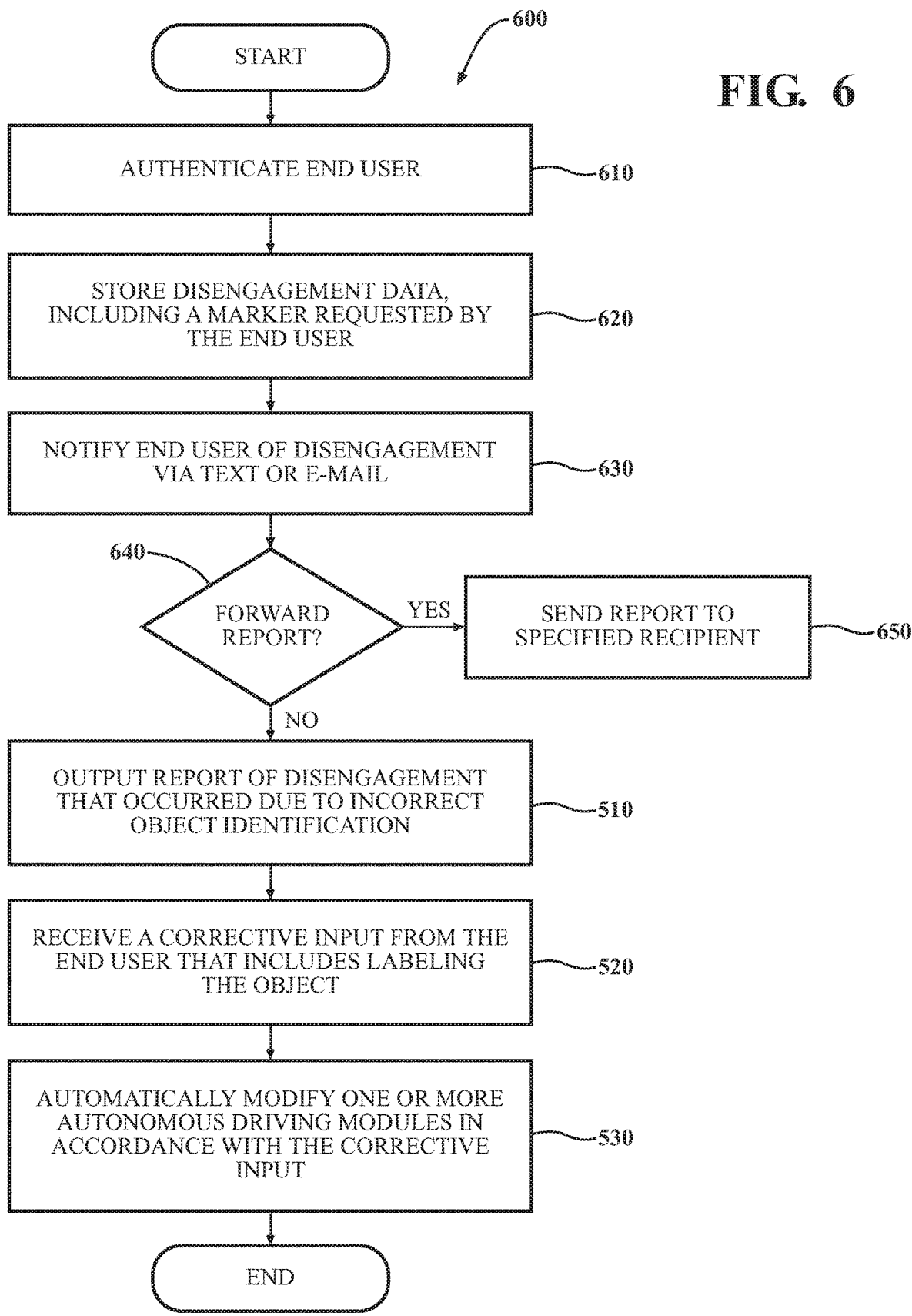
FIG. 6 is a flowchart of a method of modifying the driving behavior of a vehicle, in accordance with yet another illustrative embodiment of the invention.

FIG. 6 is a flowchart of a method 600 of modifying the driving behavior of a vehicle, in accordance with another illustrative embodiment of the invention. At block 610, server 330 authenticates the owner or other authorized end user of the vehicle 100 to provide the end user with access to end-user driving modification system 170. In one embodiment, authentication includes verifying a username and password entered by the end user, but other authentication methods can be used, depending on the particular embodiment. At block 620, tracking module 220 stores disengagement data 250 associated with an autonomous driving mode of vehicle 100, as discussed above. In this embodiment, tracking module 220, at the request of the end user, stores a marker with the disengagement data 250 to facilitate later retrieval of information concerning a particular disengagement, as explained above in connection with FIG. 2. At block 630, correction module 230 notifies an end user of the vehicle 100 of one or more disengagements that have occurred. This can be done, for example, via a text message, an e-mail, or an automated telephone call, depending on the embodiment.

At Decision block 640, the end user is presented an option to forward a disengagement report to a specified recipient. In one embodiment, server 330 forwards the disengagement report to the specified recipient. In some embodiments, the specified recipient is a support entity 340, as discussed above in connection with FIG. 3. If the end user chooses to forward the disengagement report at block 640, it is transmitted to the specified recipient at block 650. Otherwise, control proceeds to blocks 510, 520, and 530, which were described above in connection with method 500.

Figure 7:
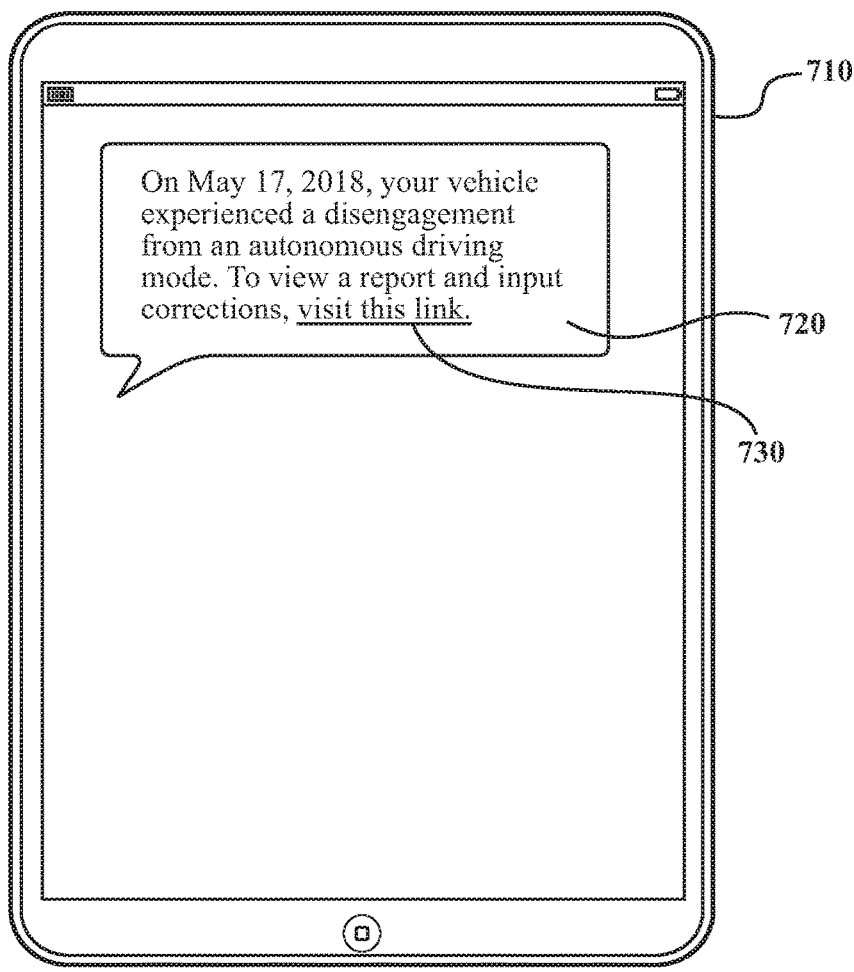
FIG. 7 illustrates an end user's mobile device displaying a text message notifying the end user of a recent disengagement of a vehicle from an autonomous driving mode, in accordance with an illustrative embodiment of the invention.

FIG. 7 illustrates an end user's mobile device 710 (e.g., a tablet computer) displaying a text message 720 notifying the end user of a recent disengagement of the vehicle 100 from an autonomous driving mode, in accordance with an illustrative embodiment of the invention. As explained above, correction module 230, in some embodiments, notifies the end user of disengagements that have recently occurred involving the vehicle 100. In other embodiments, this notification can be, for example, an e-mail message or an automated telephone call. In the example of FIG. 7, text message 720 includes a hyperlink 730 to a network address on server 330 where the user can log onto end-user driving modification system 170, view a disengagement report, and enter corrective inputs, if desired. Text message 720 thus includes an invitation to the end user to enter corrective inputs to end-user driving modification system 170.

Figure 8:
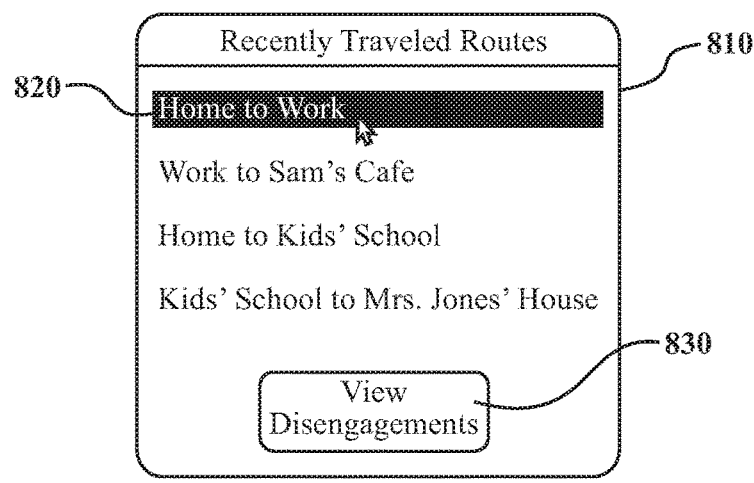
FIG. 8 illustrates a portion of a user interface for viewing a report of disengagements for a particular route selected by an end user, in accordance with an illustrative embodiment of the invention.

FIG. 8 illustrates a portion of a user interface for viewing a report of disengagements for a particular route selected by an end user, in accordance with an illustrative embodiment of the invention. In FIG. 8, end-user client computing device 320, in cooperation with server 330, displays a list of recently traveled routes 810. In some embodiments, the end user can define and name specific routes that are saved in connection with disengagement data 250. For example, in FIG. 8, the end user has selected a particular route 820 called "Home to Work." This is an example of a frequently traveled route for which the end user might desire to improve the performance of the autonomous driving system (autonomous driving module(s) 160) of the vehicle 100. The end user can view a disengagement report for that selected route and input corrective inputs, if desired, by activating the view-disengagements icon 830.

Figure 9:
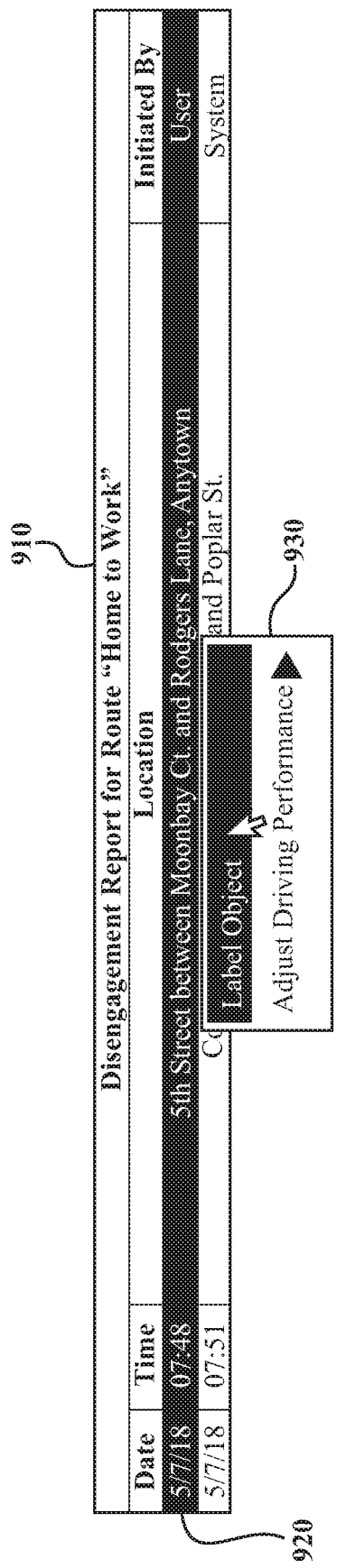
FIG. 9 illustrates a user interface for selecting an option to label an object in connection with a disengagement that occurred along a particular route selected by an end user, in accordance with an illustrative embodiment of the invention.

FIG. 9 illustrates a user interface for selecting an option to label an object in connection with a disengagement that occurred along a particular route selected by an end user, in accordance with an illustrative embodiment of the invention. In FIG. 9, end-user client computing device 320, in cooperation with server 330, displays a disengagement report 910 for the selected route "Home to Work." In this example, the end user has selected a specific disengagement 920 that occurred along the selected route. In this embodiment, the end user has right clicked on the selected disengagement 920, which invokes a context menu 930 by which the end user can choose, as corrective inputs, to label an object or to adjust the autonomous-driving performance of vehicle 100. In this particular hypothetical scenario, the end user is aware that there is a speed bump on 5th Street between Moonbay Ct. and Rodgers Lane that the sensor system 120 of vehicle 100 failed to identify. In this case, the end user caused a disengagement by intervening take manual control of the vehicle 100 to avoid going over the speed bump at an inappropriately high speed. Since this disengagement was caused by an error in identifying an object (the speed bump), the end user selects the option "Label Object."

Figure 10:
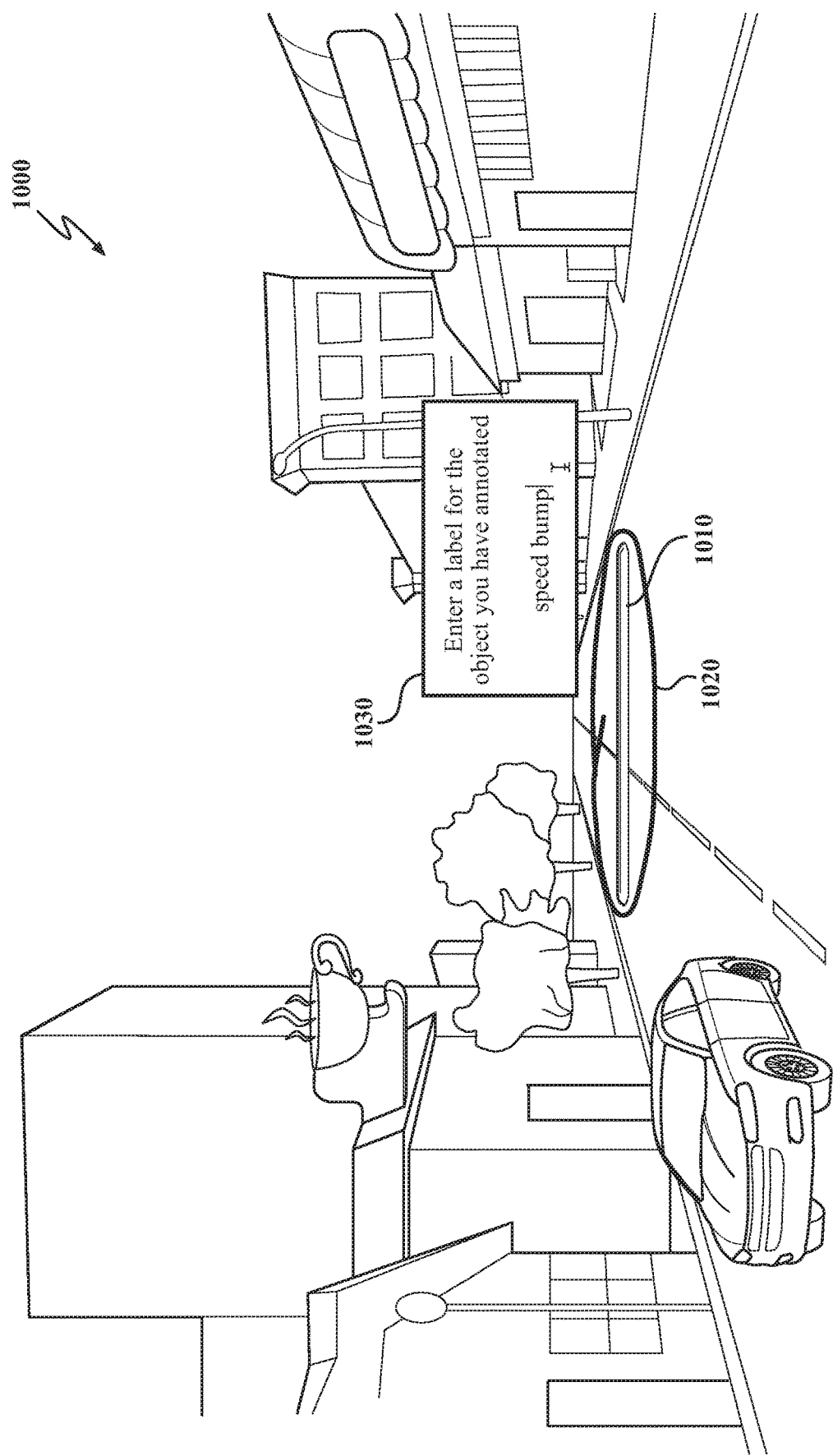
FIG. 10 is a sketch representative of image data associated with a disengagement in which an end user has annotated and labeled an object, in accordance with an illustrative embodiment of the invention.

FIG. 10 is a sketch representative of image data 1000 from sensor system 120 associated with a disengagement in which an end user has annotated and labeled an object, in accordance with an illustrative embodiment of the invention. FIG. 10 depicts the illustrative scenario discussed above in connection with FIG. 9, in which the sensor system 120 of vehicle 100 failed to identify a speed bump 1010 at a specific location along the route "Home to Work." In FIG. 10, the end user has used a graphical user interface of end-user client computing device 320 to annotate speed bump 1010. In one embodiment, this graphical user interface is provided by a Web browser running a JavaScript app, a Python app, or other suitable app. In this particular example, the end-user annotation 1020 is a loop drawn by the end user around the speed bump 1010. In other embodiments, the end user can draw a box around the object or select pixels that make up the image of the object and alter their color to identify and label the object.

Once the end user has identified the speed bump 1010 through end-user annotation 1020, the app running on end-user client computing device 320 presents a dialog box 1030 in which the end user can enter a label for the object. In this example, the end user has typed "speed bump" into the text field of dialog box 1030. Other embodiments use different types of input from the end user to label objects. For example, in one embodiment, the end user uses a voice-based interface employing speech recognition. In the embodiment depicted in FIG. 10, correction module 230 includes instructions that enable the one or more processors 110 to recognize and interpret the textual label "speed bump." Based on this recognized label, correction module 230 can modify the autonomous driving module(s) 160 of vehicle 100 to employ a particular predetermined algorithm for driving over speed bumps whenever vehicle 100 again travels the portion of the route "Home to Work" where the disengagement occurred. For example, such an algorithm could be to slow down by a specified amount prior to reaching the speed bump and then to resume a normal speed after the vehicle 100 has driven over the speed bump 1010. Once the autonomous driving module(s) 160 have been modified in accordance with the end user's corrective input, the result is that the end user, whenever traveling the route "Home to Work," will no longer experience a disengagement of the autonomous driving mode due to the vehicle 100 failing to recognize and appropriately deal with the speed bump 1010.

Note that FIG. 10 depicts labeling an object based on image (camera) data. In other embodiments, the end user can be presented with and annotate any visual sensor data from the sensor system 120 of vehicle 100, including LIDAR data or a combination of image and LIDAR data.

Figure 11:
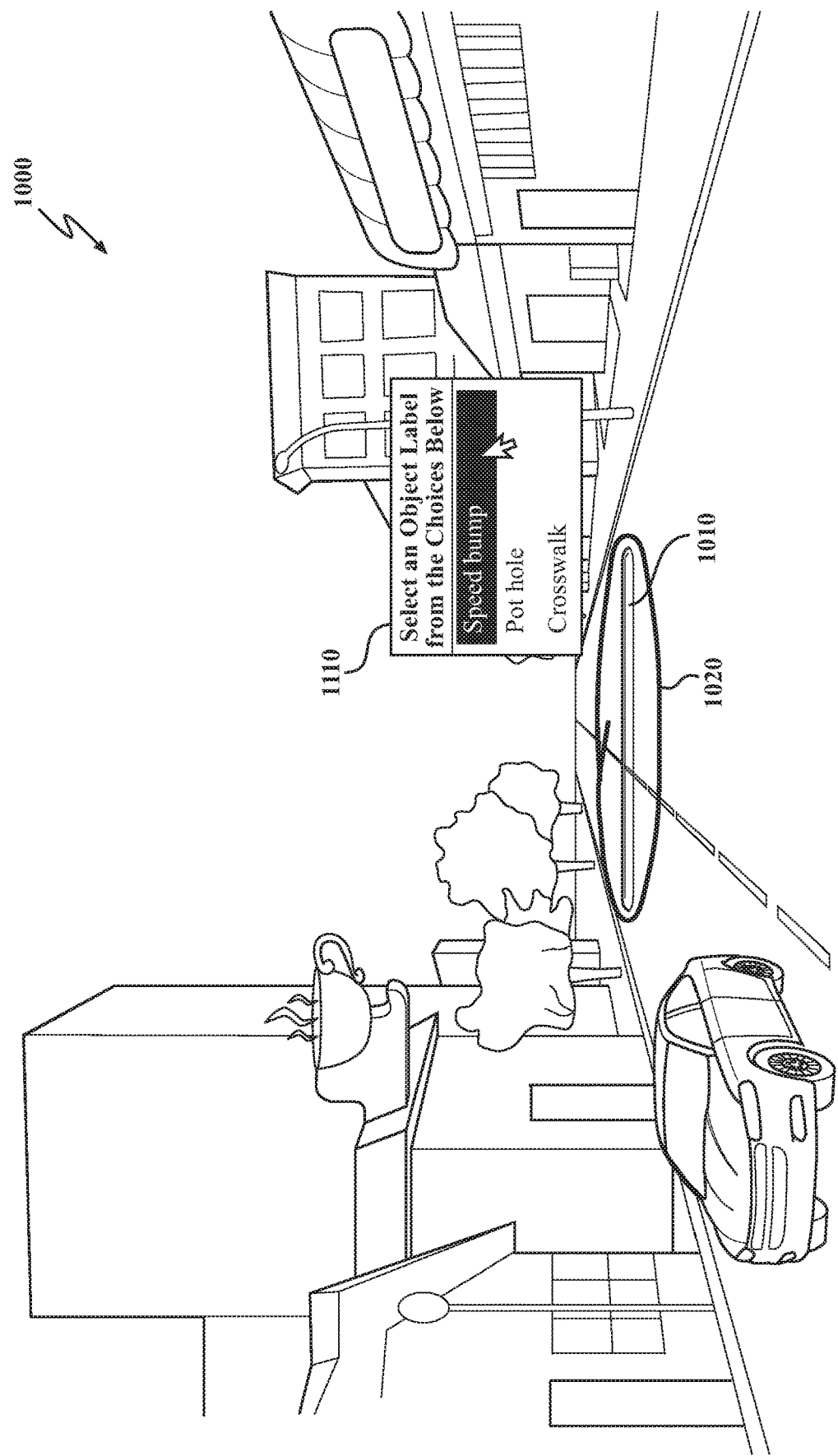
FIG. 11 is a sketch representative of image data associated with a disengagement in which an end user has annotated and labeled an object, in accordance with another illustrative embodiment of the invention.

FIG. 11 is a sketch representative of image data associated with a disengagement in which an end user has annotated and labeled an object, in accordance with another illustrative embodiment of the invention. FIG. 11 pertains to the same hypothetical disengagement scenario (the unidentified speed bump) discussed above in connection with FIGS. 9 and 10, but the user interface for labeling the identified object is different in this embodiment. In FIG. 11, once the end user has annotated the speed bump 1010 (end-user annotation 1020), a dialog box 1110 is presented to the end user containing a system-generated list of candidate labels for the annotated object. In this example, the possibilities are "speed bump," "pot hole," and "crosswalk." To label the annotated object as a "speed bump," the end user selects the label "speed bump" from the list, as shown in FIG. 11. Modification of the autonomous driving module(s) 160 by correction module 230 then proceeds as described above in connection with FIG. 10. If the correct label for the identified object is not among the candidates presented in dialog box 1110, the end user has the option to enter a label of his or her choice, as discussed above in connection with FIG. 10 (this option is not shown in FIG. 11).

FIG. 12 illustrates a user interface for adjusting the speed at which a vehicle travels in an autonomous driving mode for a segment of a particular route selected by an end user, in accordance with an illustrative embodiment of the invention. FIG. 12 is based on a different end-user-initiated disengagement scenario than that discussed in connection with FIGS. 9-11. In this scenario, the end user is concerned that a certain portion of the selected route "Home to Kids' School" (see FIG. 8) includes a street where young children often play in the street. Though the posted speed limit is 30 mph, the end user thinks that 20 mph would be safer for that portion of the route. In this example, the portion of the route that is of interest is "Courtney Lane between Saffron Ct. and Amethyst Ct." After accessing end-user driving modification system 170 via end-user client computing device 320 as discussed above, the end user selects the route "Home to Kids' School" as explained above in connection with FIG. 8. In response to this selection, server 330 serves end-user client computing device 320 a disengagement report 1210. Upon selecting the particular disengagement of interest, disengagement 1220, the end user right clicks on that disengagement to invoke context menu 1230. One of the choices in context menu 1230 is "Adjust Driving Performance." In this embodiment, this option pertains to disengagements where the underlying error is not the incorrect identification of an object. Hovering over the choice "Adjust Driving Performance" invokes context submenu 1240, which lists the types of autonomous-driving-performance modifications that are available. The choices shown in FIG. 13 are merely examples and can be different or expanded in other embodiments. In this particular example, the end user selects "Speed" to enter an altered speed for the specified portion of the route. In this case, the end user enters "20 mph" in a dialog box (not shown in FIG. 12) to override the approximate 30-mph speed at which the vehicle 100 would normally travel, based on the posted speed limit. Based on this corrective input from the end user, correction module 230 modifies autonomous driving module(s) 160 accordingly. The result is that, for subsequent trips along the route "Home to Kids' School," vehicle 100 will slow down to 20 mph for the designated portion of the route, thereby avoiding the need for the end user to cause a disengagement by intervening to assume manual control of the vehicle 100.

FIG. 13 illustrates a user interface for presenting to an end user a list of marked disengagements, in accordance with an illustrative embodiment of the invention. As discussed above, in some embodiments, correction module 230 includes instructions to store a marker in disengagement data 250 at the request of the end user. The end user inputs the request for the insertion of a marker at the time the disengagement occurs, as discussed above. This provides the end user with a simple, efficient way to access the details regarding a particular disengagement when accessing end-user driving modification system 170. In FIG. 13, the end user has activated a user-interface element (not shown in FIG. 13) to view a list of marked disengagements 1310. In this example, the disengagements are identified by numbers (1, 2, 3, etc.). In other embodiments, the labels can be letters of the alphabet, words, phrases, or graphical symbols other than numbers, letters, or phrases. When the end user selects a particular marked disengagement 1320 (in this example, the disengagement marked "2"), the end user can activate the view-details icon 1330 to view the details regarding the selected marked disengagement and enter corrective inputs, if desired, as described above.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the end-user driving modification system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the end-user driving modification system 170, and/or the autonomous driving module(s) 160 may control some or all of these vehicle systems 140 and, thus, may be partially or fully autonomous.

The processor(s) 110, the end-user driving modification system 170, and/or the autonomous driving module(s) 160 can be operably connected to communicate with the various vehicle systems 140 and/or individual components thereof. For example, returning to FIG. 1, the processor(s) 110, the end-user driving modification system 170, and/or the autonomous driving module(s) 160 can be in communication to send and/or receive information from the various vehicle systems 140 to control the movement, speed, maneuvering, heading, direction, etc. of the vehicle 100. The processor(s) 110, the end-user driving modification system 170, and/or the autonomous driving module(s) 160 may control some or all of these vehicle systems 140.

The processor(s) 110, the end-user driving modification system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the end-user driving modification system 170, and/or the autonomous driving module(s) 160 can control the direction and/or speed of the vehicle 100. The processor(s) 110, the end-user driving modification system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the end-user driving modification system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-13, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for modifying driving behavior of a vehicle, the system comprising:
   one or more processors;
   a memory communicably coupled to the one or more processors and storing:
   one or more autonomous driving modules including instructions that when executed by the one or more processors cause the one or more processors to control the vehicle when the vehicle is operating in an autonomous driving mode;
   a tracking module including instructions that when executed by the one or more processors cause the one or more processors to store disengagement data associated with the autonomous driving mode; and
   a correction module including instructions that when executed by the one or more processors cause the one or more processors to:
     output, to an end user from the stored disengagement data, a report of a disengagement that occurred along a particular route identified by the end user from a list of routes previously traveled by the vehicle, wherein the disengagement occurred due to incorrect identification, by a sensor system of the vehicle, of an object;
     receive, from the end user, a corrective input that includes labeling the object; and
     modify automatically the one or more autonomous driving modules in accordance with the corrective input to prevent future disengagements when the vehicle is traveling along the particular route in the autonomous driving mode.

2. The system of claim 1, wherein the correction module further includes instructions to authenticate the end user.

3. The system of claim 1, wherein the tracking module further includes instructions to receive, from the end user during operation of the vehicle, a request to add a marker to the disengagement data to facilitate later retrieval of information regarding the disengagement.

4. The system of claim 1, wherein the correction module further includes instructions to send to the end user, via one of an e-mail message and a text message, a notification regarding the disengagement.

5. The system of claim 4, wherein the notification includes an invitation to enter the corrective input.

6. The system of claim 1, wherein the correction module further includes instructions to transmit at least a portion of the disengagement data to a specified recipient in response to a request from the end user.

7. The system of claim 1, wherein the autonomous driving mode is a fully autonomous driving mode.

8. A method of modifying driving behavior of a vehicle, the method comprising:
   storing disengagement data associated with an autonomous driving mode of the vehicle;
   outputting, to an end user from the stored disengagement data, a report of a disengagement that occurred along a particular route identified by the end user from a list of routes previously traveled by the vehicle, wherein the disengagement occurred due to incorrect identification, by a sensor system of the vehicle, of an object;
   receiving, from the end user, a corrective input that includes labeling the object; and
   modifying automatically one or more autonomous driving modules of the vehicle in accordance with the corrective input to prevent future disengagements when the vehicle is traveling along the particular route in the autonomous driving mode.

9. The method of claim 8, further comprising authenticating the end user prior to the outputting, receiving, and modifying.

10. The method of claim 8, further comprising receiving, from the end user during operation of the vehicle, a request to add a marker to the disengagement data to facilitate later retrieval of information regarding the disengagement.

11. The method of claim 8, further comprising sending to the end user, via one of an e-mail message and a text message, a notification regarding the disengagement.

12. The method of claim 11, wherein the notification includes an invitation to enter the corrective input.

13. The method of claim 8, wherein the disengagement data includes sensor output data, and labeling the object includes graphically annotating the sensor output data.

14. The method of claim 13, wherein the sensor output data is at least one of image data and light detection and ranging (LIDAR) data.

15. The method of claim 8, wherein labeling the object includes selecting an object label from among one or more candidate object labels presented to the end user.

16. The method of claim 8, further comprising transmitting at least a portion of the disengagement data to a specified recipient in response to a request from the end user.

* * * * *